United States Patent
Klein et al.

(10) Patent No.: US 12,441,170 B2
(45) Date of Patent: Oct. 14, 2025

(54) ELECTRICALLY OPERABLE FINAL DRIVE TRAIN

(71) Applicant: Schaeffler Technologies AG & Co. KG, Herzogenaurach (DE)

(72) Inventors: Martin Klein, Scheinfeld (DE); Vitali Reh, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 293 days.

(21) Appl. No.: 18/180,194

(22) Filed: Mar. 8, 2023

(65) Prior Publication Data
US 2023/0286364 A1  Sep. 14, 2023

(30) Foreign Application Priority Data
Mar. 8, 2022 (DE) .................. 102022105371.7

(51) Int. Cl.
  *H02K 5/22* (2006.01)
  *B60K 1/00* (2006.01)
  *H02K 11/02* (2016.01)

(52) U.S. Cl.
  CPC .............. *B60K 1/00* (2013.01); *H02K 5/225* (2013.01); *H02K 11/02* (2013.01); *B60K 2001/001* (2013.01)

(58) Field of Classification Search
  CPC .......... H02K 5/22; H02K 5/225; H02K 11/02; H02K 11/30; H02K 11/33; H02K 11/00; H02K 11/01; H02K 11/014; H02K 11/0141; B60K 1/00; B60K 2001/001
  See application file for complete search history.

(56) References Cited

U.S. PATENT DOCUMENTS

| | | | |
|---|---|---|---|
| 2013/0088106 A1* | 4/2013 | Bitzer | H02K 5/10 310/71 |
| 2018/0287307 A1* | 10/2018 | Oka | H01R 13/6581 |
| 2018/0290530 A1* | 10/2018 | Chai | B60K 1/00 |

FOREIGN PATENT DOCUMENTS

| | | | |
|---|---|---|---|
| CN | 214672073 | 11/2021 | |
| CN | 216774539 | 6/2022 | |
| DE | 102019112268 | 11/2019 | |
| FR | 2973591 A1 * | 10/2012 | ......... H01R 13/7193 |
| JP | 2018200824 A * | 12/2018 | |

(Continued)

OTHER PUBLICATIONS

Nickel, Machine Translation of WO2022219022, Oct. 2022 (Year: 2022).*

(Continued)

*Primary Examiner* — Eric Johnson
(74) *Attorney, Agent, or Firm* — Volpe Koenig (57) ABSTRACT

An electrically operable final drive train for a motor vehicle including an electric machine that can be energized by a power electronics unit and a transmission arrangement which is coupled to the electric machine in a torque-transmitting manner. An electrical high-voltage interface is formed between the power electronics unit and the electric machine, and the power electronics unit is received in an inverter housing. The inverter housing is passed through by at least one first busbar, and which is electrically conductively coupled to the electric machine. The first busbar passes through an EMC filter element arranged inside the inverter housing.

18 Claims, 5 Drawing Sheets

(56) References Cited

FOREIGN PATENT DOCUMENTS

WO         2021152888         8/2021
WO    WO-2022219022 A1 * 10/2022

OTHER PUBLICATIONS

Takagi, Machine Translation of JP2018200824, Dec. 2018 (Year: 2018).*
Schwartz, Machine Translation of FR2973591, Oct. 2012 (Year: 2012).*
ATZ magazine, vol. 113, pp. 10-15 by Erik Schneider, Frank Fickl, Bernd Cebulski and Jens Liebold with the title: Highly Integrative and Flexible Electric Drive Unit for E-vehicles, May 2011.

* cited by examiner

ELECTRICALLY OPERABLE FINAL DRIVE TRAIN

CROSS-REFERENCE TO RELATED APPLICATIONS

This application claims priority to German Patent Application No. 10 2022 105 371.7, filed Mar. 8, 2022, the entire disclosure of which is incorporated by reference herein.

TECHNICAL FIELD

The present disclosure relates to an electrically operable final drive train for a motor vehicle comprising an electric machine that can be energized by a power electronics unit and a transmission arrangement which is coupled to the electric machine in a torque-transmitting manner, wherein an electrical high-voltage interface is formed between the power electronics unit and the electric machine, and the power electronics unit is received in an inverter housing, wherein the inverter housing is passed through by at least one first busbar, and which is electrically conductively coupled to the electric machine.

BACKGROUND

Electric motors are increasingly being used to drive motor vehicles to create alternatives to internal combustion engines that require fossil fuels. Significant efforts have already been made to improve the suitability of electric drives for everyday use and also to be able to offer users the driving comfort to which they are accustomed.

A detailed description of an electric drive can be found in an article in the ATZ magazine, Volume 113, May 2011, pages 10-15 by Erik Schneider, Frank Fickl, Bernd Cebulski and Jens Liebold with the title: Highly Integrative and Flexible Electric Drive Unit for E-vehicles, which is probably the closest prior art. This article describes a drive unit for an axle of a vehicle, which comprises an electric motor that is arranged to be concentric and coaxial with a bevel gear differential, wherein a shiftable 2-speed planetary gear set is arranged in the drive train between the electric motor and the bevel gear differential, which is also positioned to be coaxial to the electric motor or the bevel gear differential or spur gear differential. The drive unit is designed to be very compact and allows for a good compromise between climbing ability, acceleration and energy consumption due to the shiftable 2-speed planetary gear set. Such drive units are also referred to as e-axles or electrically operable drive trains.

Increasingly, axial flux machines are also used in such e-axles. An axial flux machine is a dynamo-electric machine in which the magnetic flux between the rotor and stator runs parallel to the axis of rotation of the rotor. Often, both the stator and the rotor are designed to be largely disc-shaped. Axial flux machines are particularly advantageous when the axially available installation space is limited in a given application. This is often the case, for example, with the electric drive systems for electric vehicles described at the outset. In addition to the shortened axial installation length, a further advantage of the axial flux machine is its comparatively high torque density. The reason for this is, compared to radial flux machines, the larger air gap area which is available for a given installation space. Furthermore, a lower iron volume is required compared to conventional machines, which has a positive effect on the efficiency of the machine.

Such electric axial flux machines, as well as radial flux machines, are usually supplied with power using a power electronics module, which is also referred to as an inverter. First of all, there is a continuing need to design the inverter and the electric machine as compactly as possible in this regard and to design them particularly advantageously in terms of production and assembly technology.

If several electronic devices are arranged in close proximity to one another, as is the case, for example, in such an electric final drive train of a motor vehicle of the type mentioned at the outset, it is necessary to protect the respective electronic devices from the electromagnetic radiation of the other electronic devices, since the electromagnetic radiation can disrupt the respective electronic functions of the components, which is generally undesirable.

SUMMARY

It is therefore the object of the present disclosure to provide an electric final drive train for a motor vehicle, the electrical interface of which is protected from electromagnetic radiation. In particular, it is intended to provide a low-cost and space-saving means of protecting the electrical interface. Furthermore, the electric final drive train should be compact in design, and easy to assemble as well as inexpensive to manufacture.

This object is achieved by an electrically operable final drive train for a motor vehicle comprising an electric machine that can be energized by a power electronics unit and a transmission arrangement which is coupled to the electric machine in a torque-transmitting manner, wherein an electrical high-voltage interface is formed between the power electronics unit and the electric machine, and the power electronics unit is received in an inverter housing, wherein the inverter housing is passed through by at least one first busbar, and which is electrically conductively coupled to the electric machine, wherein the first busbar passes through an EMC filter element arranged inside the inverter housing.

This achieves the advantage that, on the one hand, a particularly compact final drive train can be implemented which can provide particularly effective EMC shielding.

The EMC filter element arranged in the inverter housing ensures that the electronic devices, such as the electric machine and the power electronics unit, can be operated in the immediate vicinity of one another without interfering with one another due to their electromagnetic radiation. In particular, the electromagnetic radiation emitted from the electric machine can be effectively prevented from affecting the electrical high-voltage interface. At the same time, the EMC filter element of the electrical high-voltage interface protects the surrounding electronic devices, in particular the electric machine, from electromagnetic radiation emitted from the electrical high-voltage interface.

An electrically operable final drive train comprises an electric machine and preferably a transmission arrangement coupled to the electric machine. The transmission arrangement and the electric machine form a structural unit. This can be formed, for example, by means of a drive train housing, in which the transmission arrangement and the electric machine are received together.

Alternatively, it would of course also be possible for the electric machine to have a motor housing and/or the transmission to have a transmission housing, wherein the structural unit can then be effected by fixing the transmission in relation to the electric machine. The transmission housing is a housing for receiving a transmission. It has the task of guiding existing shafts via the bearings in each case and granting the wheels (possibly cam plates) the degrees of freedom they require under all loads, without hindering them in their rotary and possibly path movement, as well as absorbing bearing forces and supporting torques. A transmission housing can be designed as single-shell or multi-shell, that is, undivided or divided. In particular, the housing should also dampen noise and vibrations and also be able to safely absorb lubricant. The transmission housing is preferably formed from a metallic material, particularly preferably from aluminum, gray cast iron or cast steel, in particular by means of a primary shaping process such as casting or die-casting.

The motor housing houses the electric machine. A motor housing can also receive the control and power electronics unit. The motor housing can furthermore be part of a cooling system for the electric machine, and can be designed in such a way that cooling fluid can be supplied to the electric machine via the motor housing and/or the heat can be dissipated to the outside via the housing surfaces. In addition, the motor housing protects the electric machine and any electronics that might be present from external influences.

A motor housing can be formed in particular from a metallic material. Advantageously, the motor housing can be formed from a metallic cast material, such as die-cast aluminum, die-cast magnesium, cast iron, or cast steel.

Electric machines are used to convert electrical energy into mechanical energy and/or vice versa, and generally comprise a stationary part referred to as a stator, stand, or armature, and a part referred to as a rotor or runner, and arranged movably, in particular rotatably, relative to the stationary part.

The electric machine of the final drive train according to the disclosure is preferably designed as an axial flux machine. The magnetic flux in an electric axial flux machine (AFM) is directed axially to a direction of rotation of the rotor of the axial flux machine in the air gap between the stator and the rotor. There are various types of axial flux machines. One known type is what is termed an I arrangement, in which the rotor is arranged so as to be axially adjacent to a stator or between two stators. Another known type is what is termed an H arrangement, in which two rotors are arranged on opposite axial sides of a stator. The electric axial flux machine is preferably configured as an I-type.

In principle, it is also possible for a plurality of rotor-stator configurations to be arranged axially adjacent as an I-type and/or H-type. It would also be possible in this context to arrange both one or more I-type rotor-stator configurations and one or more H-type rotor-stator configurations adjacent to one another in the axial direction. In particular, it is also preferable that the rotor-stator configurations of the H-type and/or the I-type are each designed essentially identically, so that they can be assembled in a modular manner to form an overall configuration. Such rotor-stator configurations can in particular be arranged to be coaxial to one another and can be connected to a common rotor shaft or to a plurality of rotor shafts.

In particular, the electric machine is dimensioned in such a way that vehicle speeds of more than 50 km/h, preferably more than 80 km/h, and in particular more than 100 km/h can be achieved. The electric motor particularly preferably has an output of more than 30 kW, preferably more than 50 kW, and in particular more than 70 kW. Furthermore, it is preferred that the electric machine provides speeds greater than 5,000 rpm, particularly preferably greater than 10,000 rpm, very particularly preferably greater than 12,500 rpm.

For the purposes of this application, motor vehicles are land vehicles that are moved by machine power without being restricted to railroad tracks. A motor vehicle can be selected, for example, from the group of passenger cars, trucks, small motorcycles, light motor vehicles, motorcycles, buses or coaches, or tractors.

In particular, the transmission arrangement can be coupled to the electric machine, which is designed to generate a drive torque for the motor vehicle. The drive torque is particularly preferably a main drive torque, so that the motor vehicle is driven exclusively by the drive torque. The transmission arrangement is preferably designed as a planetary gear unit, very particularly preferably as a shiftable, in particular two-speed planetary gear unit.

The power electronics unit is received in an inverter housing. The inverter housing can preferably be formed from a metallic material, particularly preferably from aluminum, gray cast iron or cast steel, in particular by means of a primary shaping process such as casting or die-casting. The inverter housing particularly preferably has a pot-like spatial shape. In this context, it is particularly preferable that the housing cover can be inserted into the pot-like inverter housing. Alternatively, it would also be conceivable for the housing cover to rest on the pot-like inverter housing and cover its opening.

The inverter housing can also be part of the motor housing or vice versa. This means that the inverter housing is formed completely or partially integral, in particular monolithic, with the motor housing.

According to a further particularly preferred embodiment, the housing cover can be formed from a metallic material, in particular from a steel. Furthermore, the disclosure can also be further developed in that the inverter housing is formed from a metallic material. The advantage of this embodiment is that particularly good electromagnetic shielding of the surrounding components can be achieved with a metal inverter housing and/or housing cover. The housing cover is most preferably formed from pure sheet metal.

The power electronics unit received in the inverter housing can be provided in particular for an electric machine of an electrically operable drive train of a motor vehicle. The power electronics unit is preferably a combination of different components that control or regulate a current to the electric machine of the final drive train, preferably including the peripheral components required for this purpose, such as cooling elements or power supply units. In particular, the power electronics unit contains one or more power electronics components that are configured to control or regulate a current. This is particularly preferably one or more power switches, such as power transistors. The power electronics unit particularly preferably has more than two, particularly preferably three, phases or current paths which are separate from one another and each have at least one separate power electronics component. The power electronics unit is preferably designed to control or regulate a power per phase with a peak power, preferably continuous power, of at least 10 W, preferably at least 100 W, particularly preferably at least 1000 W.

The power electronics unit preferably also has a control electronics unit and/or sensor electronics unit for the electric final drive train, for example an ACU. The power electronics module preferably has a motor current connection and/or an electrical signal and/or clutch actuator connection and/or a coolant connection, which are each connected to a corresponding connection.

The electric final drive train can be operated by means of the power electronics module, preferably in that the power electronics module conducts current into the electrically operable final drive train, e.g., to a stator winding of the electric machine.

It can also be advantageous to further develop the disclosure in such a way that the electrical high-voltage interface is arranged radially above a stator of the electric machine, which results in an advantageous axial nesting of the inverter housing and motor housing or transmission housing, which also promotes an axially very compact design of the final drive train.

In connection with the present disclosure, it can also be advantageous for the power electronics unit to be axially directly adjacent to the electric machine, so that the electrical conductors between the electric machine and the power electronics unit can be designed to be as short as possible.

According to an advantageous embodiment according to the disclosure, the EMC filter element can comprise a ring-like ferrite core which is held in a carrier element, wherein the ferrite core is passed through by the first busbar, which has proven to be particularly favorable in terms of a compact installation space design and EMC filter effect.

According to a further preferred further development, the carrier element can have a ring-like, circumferentially closed contour, against the inside of which the ferrite core rests. It is particularly preferred here that the carrier element is formed from a plastic. It is then possible to encapsulate the ferrite core completely or in sections with a plastic, as a result of which the ferrite core can be securely fixed in or on the carrier element.

Furthermore, according to a likewise advantageous embodiment, the inverter housing can be closed by means of a housing cover and the carrier element can be fixed to the housing cover, which has proven to be particularly easy to assemble.

According to a further particularly preferred embodiment, a circumferential seal can be arranged between the ferrite core and the housing cover, so that the inside of the inverter housing is reliably protected against the ingress of oil or dust, for example. The seal can be designed as an O-ring, for example.

Furthermore, the disclosure can also be further developed such that an electrical insulation element is arranged inside the ring-like ferrite core, which rests against the first busbar. The advantage of this embodiment is that a defined positioning of the busbar relative to the ferrite core is established, which improves the EMC filter effect and also increases assembly and operational reliability.

In a likewise preferred embodiment variant according to the disclosure, the EMC filter element can be passed through by the first busbar and a second busbar and a third busbar, wherein the second busbar and the third busbar are electrically conductively coupled to the electric machine. As a result, a compact electrical high-voltage interface can be provided for a 3-phase electric machine, and all busbars of the three phases are enclosed by an EMC filter element.

It can also be advantageous to further develop the disclosure such that the carrier element is fastened to the housing cover by means of self-sealing screws which are accessible from outside the housing cover. The advantage that can be realized in this way is that the inside of the inverter housing is well protected against external influences such as oil or dust without increasing the assembly effort.

According to a further preferred embodiment of the subject matter disclosed herein, the first busbar and/or the second busbar and/or the third busbar can extend through the housing cover in a manner axially parallel to the axis of rotation of a rotor of the electric machine.

This allows the EMC filter element to be mounted particularly easily by sliding it on axially.

Finally, the disclosure can also be implemented in an advantageous manner such that the housing cover extends in a radial plane to the axis of rotation of the rotor of the electric machine, which means that an axially very compact final drive train can be implemented in particular.

BRIEF DESCRIPTION OF THE DRAWINGS

The disclosure will be explained in more detail below with reference to figures without limiting the general concept disclosed herein.

In the figures.

DETAILED DESCRIPTION

Figure 1:
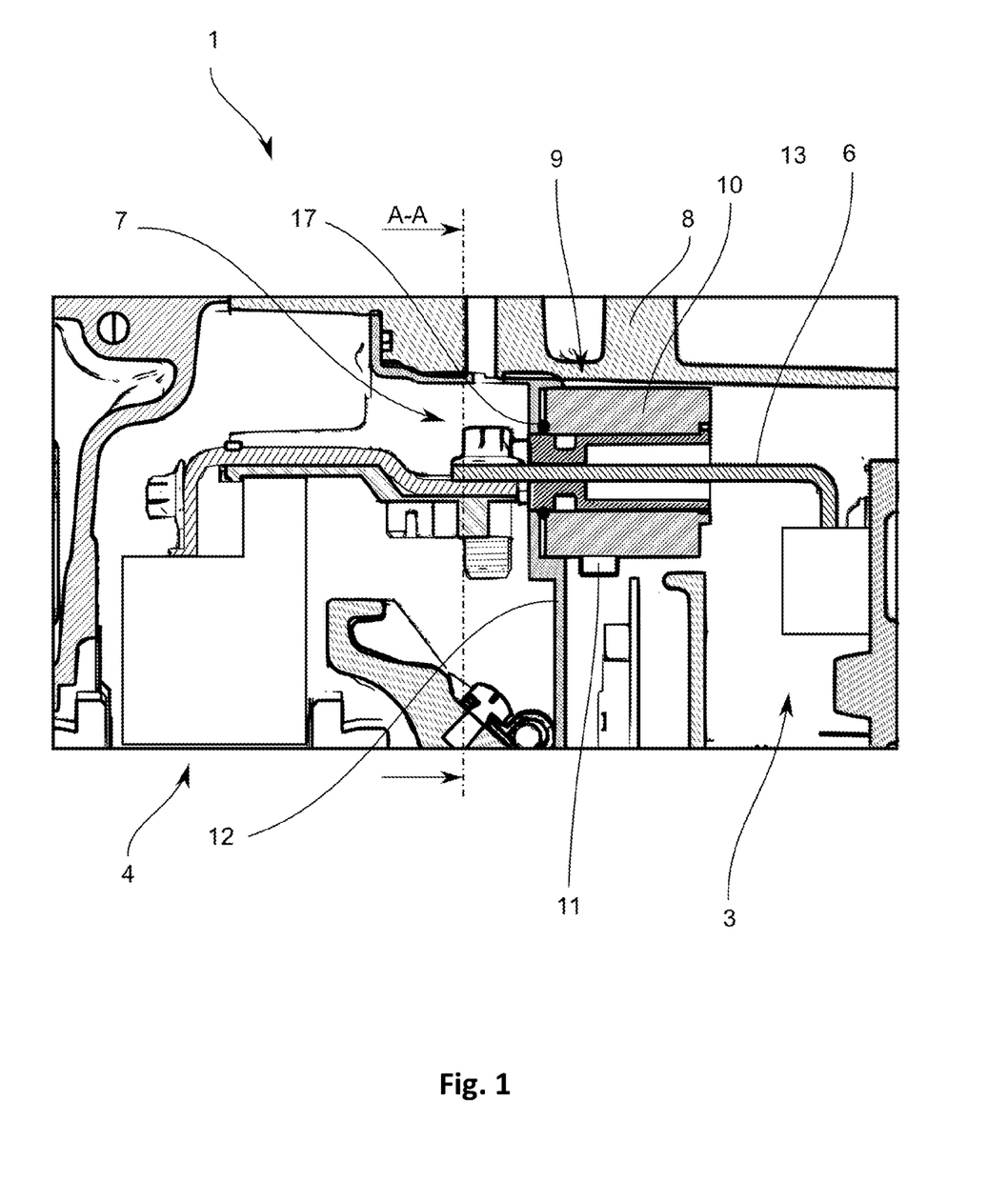
FIG. 1 shows a final drive train in a schematic axial sectional view.
Figure 5:
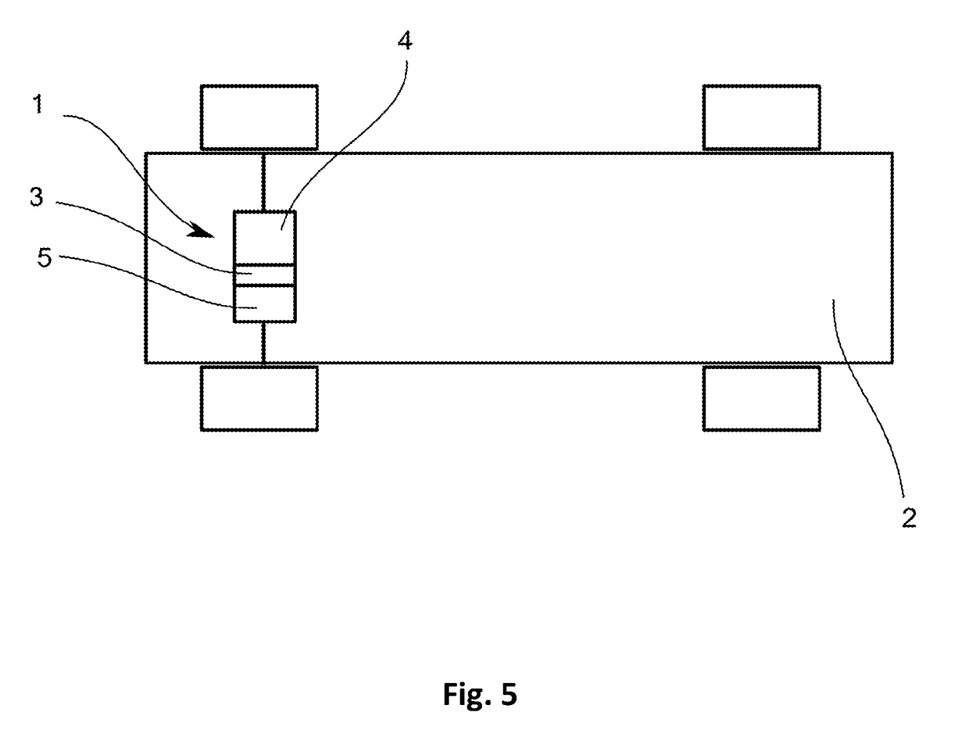

FIG. 1 shows a detailed view of an electrically operable final drive train 1 for a motor vehicle 2, as is also shown in an exemplary manner in FIG. 5. The final drive train 1 comprises an electric machine 4 that can be energized by a power electronics unit 3 and a transmission arrangement 5 which is coupled to the electric machine 4 in a torque-transmitting manner.

In the embodiment shown in FIG. 1, the power electronics unit 3 is positioned directly axially adjacent to the electric machine 4 designed as an axial flux machine. The transmission arrangement 5 is located to the left of the electric machine 4. In principle, however, it would also be possible to arrange the power electronics unit 3 axially between the electric machine 4 and the transmission arrangement 5, as indicated in FIG. 5.

An electrical high-voltage interface 7 is formed between the power electronics unit 3 and the electric machine 4 to electrically connect the power electronics unit 3 to the electric machine 4. The power electronics unit 3 is received in an inverter housing 8 which is passed through by a first busbar 6, a second busbar 14, and a third busbar 15, and which is electrically conductively coupled to the electric machine 4. The three busbars 6, 14, 15 are provided for energizing the electric machine 4 with three phases. The three busbars 6, 14, 15 can also be seen clearly when viewed in conjunction with FIG. 2 and FIG. 4.

Figure 2:
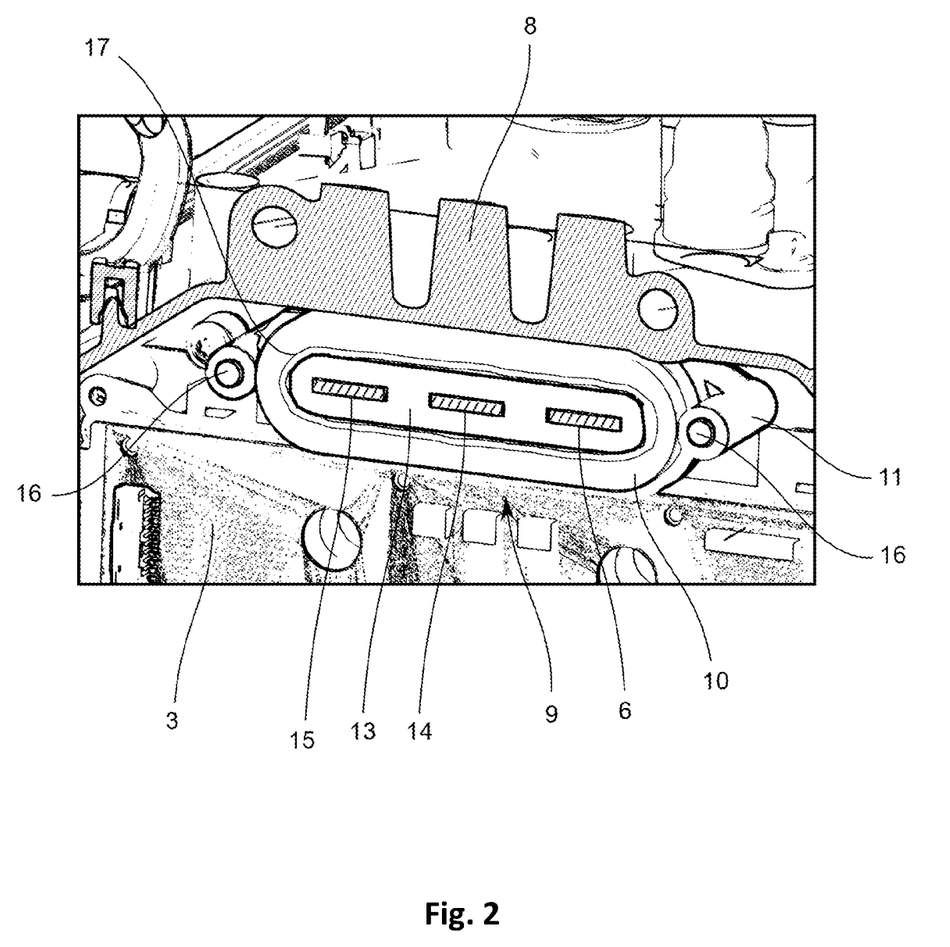
FIG. 2 shows a final drive train in a perspective cross-sectional view.
Figure 3:
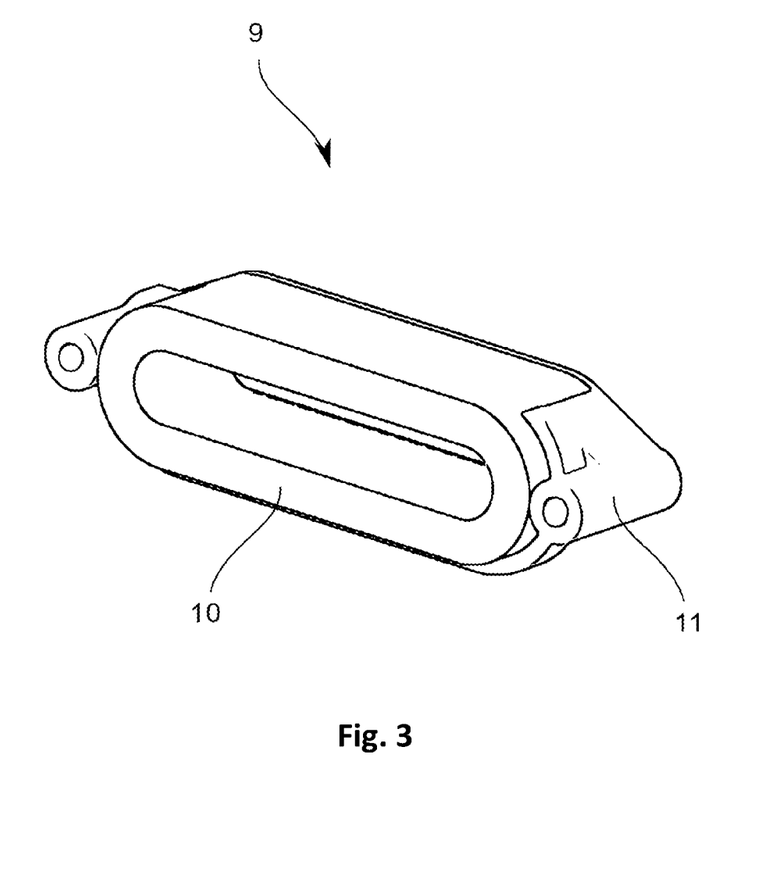
FIG. 3 shows an EMC filter element in an isolated perspective view.

The busbars 6, 14, 15 jointly pass through an EMC filter element 9 arranged inside the inverter housing 8, which can be easily understood from FIG. 2. FIG. 2 also shows that an electrical insulation element 13 is arranged inside the ring-like ferrite core 10, which rests against the busbars 6, 14, 15. The EMC filter element 9 has a ring-like ferrite core 10 which is held in a carrier element 11, wherein the ferrite core 10 is passed through by the busbars 6, 14, 15. The carrier element 11 has a ring-like, circumferentially closed contour, against the inside of which the ferrite core 10, which can be understood particularly well from the isolated representation of the EMC filter element 9 in FIG. 3.

Figure 4:
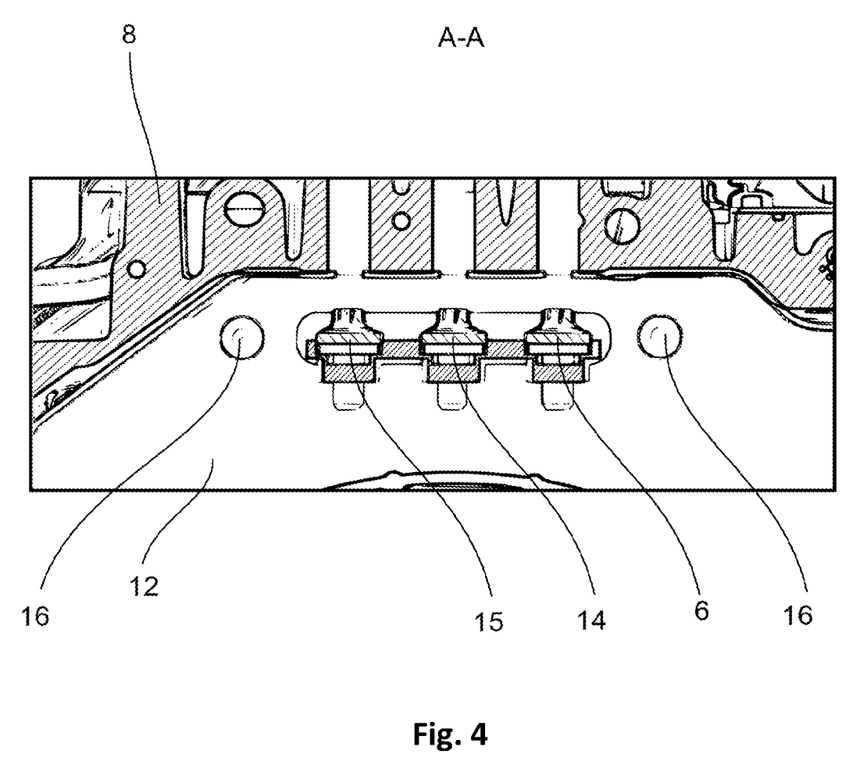
FIG. 4 shows a final drive train in a cross-sectional view directed towards the housing cover and FIG. 5 shows a motor vehicle with a final drive train in a schematic block diagram.

Looking at FIG. 1 in conjunction with FIG. 4 shows that the inverter housing 8 can be closed by means of a housing cover 12 and the carrier element 11 is fixed to the housing cover 12. The carrier element 11 is fixed by means of self-sealing screws 16 which are accessible from outside the housing cover 12, as shown in FIG. 4.

A circumferential seal 17 is arranged between the ferrite core 10 and the housing cover 12, which is pressed axially between the housing cover 12 and the ferrite core 10. This can be understood well from looking at FIGS. 1-2 together. The housing cover 12 extends in a radial plane to the axis of rotation of the rotor of the electric machine 4 and the first busbar 6, the second busbar 14 and the third busbar 15 extend through the housing cover 12 in a manner axially parallel to the axis of rotation of the rotor of the electric machine 4. This allows assembly from the axial direction, which has ergonomic advantages when the components "power electronics unit" and "electric machine" are assembled axially one after the other.

The disclosure is not limited to the embodiments shown in the figures. The above description is therefore not to be regarded as limiting, but rather as illustrative. The following claims are to be understood as meaning that a named feature is present in at least one embodiment as disclosed herein. This does not exclude the presence of further features. If the patent claims and the above description define 'first' and 'second' features, this designation serves to distinguish between two features of the same type without defining an order of precedence.

LIST OF REFERENCE SYMBOLS

1 Final drive train
2 Motor vehicle
3 Power electronics unit
4 Electric machine
5 Transmission arrangement
6 Busbar
7 High-voltage interface
8 Inverter housing
9 EMC filter element
10 Ferrite core
11 Carrier element
12 Housing cover
13 Insulation element
14 Busbar
15 Busbar
16 Screw
17 Seal

The invention claimed is:

1. An electrically operable final drive train for a motor vehicle, the final drive train comprising:
an electric machine;
a power electronics unit by which the electric machine is energizable;
a transmission arrangement coupled to the electric machine in a torque-transmitting manner;
an electrical high-voltage interface formed between the power electronics unit and the electric machine;
an inverter housing in which the power electronics unit is received, the inverter housing is passed through by at least one first busbar that is electrically conductively coupled to the electric machine, and the inverter housing is closeable by a housing cover; and
an EMC filter element through which the first busbar passes arranged inside the inverter housing, the EMC filter comprising a ferrite core and a carrier element that is fixed to the housing cover so that the ferrite core is within an indentation of the housing cover.

2. The final drive train according to claim 1, wherein the ferrite core is ring-shaped which is held in the carrier element, and the ferrite core is passed through by the first busbar.

3. The final drive train according to claim 2, wherein the carrier element has a ring-shaped, circumferentially closed contour, against an inside of which the ferrite core rests.

4. The final drive train according to claim 2, further comprising a circumferential seal arranged between the ferrite core and the housing cover.

5. The final drive train according to claim 2, further comprising an electrical insulation element arranged inside the ring-shaped ferrite core, which rests against the first busbar.

6. The final drive train according to claim 1, wherein the ferrite core is ring-shaped which is held in the carrier element, the ferrite core is passed through by the first busbar, and the carrier element is fastened to the housing cover by self-sealing screws which are accessible from outside the housing cover.

7. The final drive train according to claim 1, wherein the EMC filter element is passed through by the first busbar, a second busbar, and a third busbar, and the second busbar and the third busbar are electrically conductively coupled to the electric machine.

8. The final drive train according to claim 7, wherein at least one of the first busbar, the second busbar, or the third busbar extends through the housing cover axially parallel to an axis of rotation of a rotor of the electric machine.

9. The final drive train according to claim 8, wherein the housing cover extends in a radial plane to the axis of rotation of the rotor of the electric machine.

10. The final drive train according to claim 1, wherein the indentation comprises a pot-like spatial shape.

11. An electrically operable final drive train for a motor vehicle, the final drive train comprising:
an electric machine;
a power electronics unit;
an electrical high-voltage interface formed between the power electronics unit and the electric machine;
an inverter housing in which the power electronics unit is received, the inverter housing is passed through by at least one first busbar that is electrically conductively coupled to the electric machine, and the inverter housing is closeable by a housing cover; and
an EMC filter element through which the first busbar passes that is arranged inside the inverter housing, the EMC filter element comprising a ferrite core and a carrier element fixed to the housing cover, and a seal is arranged directly between the ferrite core and the housing cover.

12. The final drive train according to claim 11, wherein the ferrite core comprises an opening defined therein that is held in the carrier element, and the ferrite core is passed through by the first busbar.

13. The final drive train according to claim 12, wherein the carrier element has a circumferentially closed contour, against an inside of which the ferrite core rests.

14. The final drive train according to claim 12, further comprising an electrical insulation element arranged inside the ferrite core, which rests against the first busbar.

15. The final drive train according to claim 11, wherein the ferrite core comprises an opening defined therein that is held in the carrier element, the ferrite core is passed through by the first busbar, and the carrier element is fastened to the housing cover by self-sealing screws which are accessible from outside the housing cover.

16. The final drive train according to claim 11, wherein the EMC filter element is passed through by the first busbar, a second busbar, and a third busbar, and the second busbar and the third busbar are electrically conductively coupled to the electric machine.

17. The final drive train according to claim 16, wherein at least one of the first busbar, the second busbar, or the third busbar extends through the housing cover axially parallel to an axis of rotation of a rotor of the electric machine.

18. The final drive train according to claim 17, wherein the housing cover extends in a radial plane to the axis of rotation of the rotor of the electric machine.

\* \* \* \* \*